United States Patent Office 3,031,137

Patented Apr. 24, 1962

3,031,137

STORAGE DEVICE FOR INFORMATION REPRESENTED BY ELECTRIC PULSES

Gerard N. Koehler, 11 Rue des Girondins, Saint-Cloud, France

Filed Dec. 1, 1959, Ser. No. 856,398
Claims priority, application France Dec. 4, 1958
16 Claims. (Cl. 235—61.11)

Figure 1:
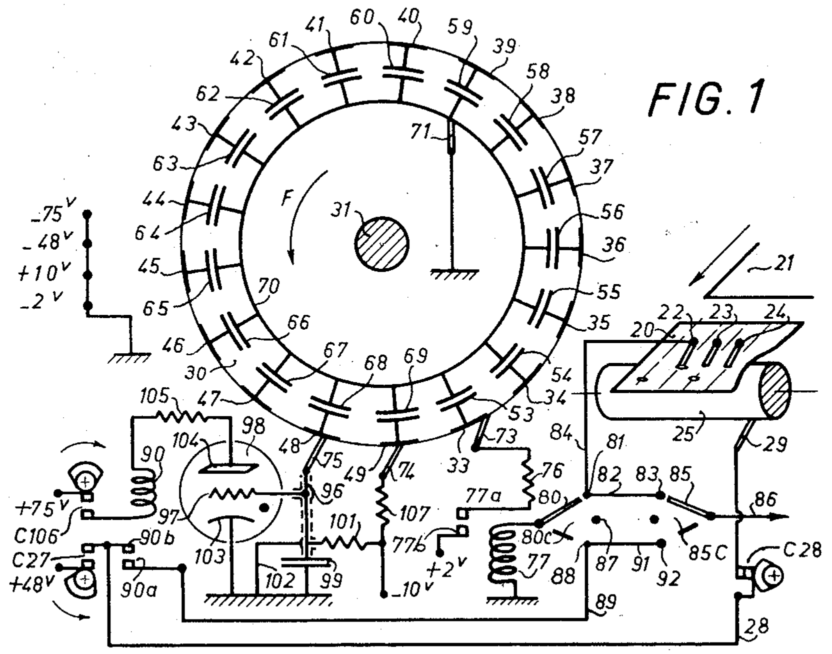

This invention relates to a cyclically operable storage device intended for writing and reading, in the course of one or more successive cycles, information or elements of information represented by one or more electric pulses transmitted at given instants in a cycle in accordance with a coded system. A device for writing and reading information designed in accordance with the invention is suitable more especially for writing and reading information or elements of information in accounting or statistical machines operating with record cards or tapes, high-speed computing equipment or similar cyclically operating machines in which information or elements of information are represented by electric pulses or pulse groups which are transmitted at given instants in a cycle in accordance with a coded system.

In these machines, it is often necessary temporarily to store information and to be able to re-transmit it thereafter with the same phase in the course of one or more successive cycles to utilisation devices.

In the field of accounting or statistical machines controlled by record cards or tapes, cyclically operating storage devices comprising electromagnetic relays are known in which a rotary distributing device rotating synchronously with the cyclically operating members of the machine distributes among contact studs, which are each connected to a relay, pulses which represent data to be stored. When a pulse is applied to one of the said studs at a given instant in a machine cycle, the relay connected to the said stud is energised and closes the contact in a circuit which holds the said relay in the energised state, and maintains the stud under voltage as long as the said holding circuit is not interrupted. Each time the distributor passes, during the succeeding cycles, over a stud maintained under voltage by the holding circuit, the said distributor can transmit a pulse which corresponds in a cycle to the pulse which has served to energise the said relay in the course of a recording cycle. Pulses, pulse series or pulse groups can thus be recorded and re-transmitted to comparison, computing or recording devices by one or more storage devices employed in combination. Storage devices of this type are generally very suitable for machines operating at low speeds of the order of one hundred to one hundred and fifty cycles per minute, but they are costly, heavy and bulky by reason of the considerable number of relays which they require.

In addition, high-capacity storage devices comprising magnetic drums, magnetic cores or ferro-electric elements are known. These devices operate at very high speeds, but they require complex and fragile electronic amplification and switching circuits, which are of no true interest except for electronic machines operating at very high speeds and having very large capacity.

In medium-speed machines, the main elements of the circuits consist of quick-acting electromagnetic relays. These machines are satisfactory in specific cases of utilisation under particularly advantageous conditions in regard to cost of construction, speed of operation and cost of maintenance.

An object of the present invention is to provide an improved storage device which operates reliably and rapidly, has reduced overall dimensions, is economic to construct and is capable of rendering very long service in medium-speed machines.

A storage device designed in accordance with the invention comprises mainly storage means (condensers), switching means (rotary distributor comprising contact studs and brushes), a relay and a synchronised pulse generator.

A storage device designed in accordance with the invention is more especially suitable for storing information analysed on record cards or tapes and emanating from computers and for thereafter re-emitting the said information in the course of one or more successive cycles.

In a storage device designed in accordance with the invention, an electric pulse representing an item of information to be stored, or an element thereof, is applied through electromechanical switching means, such as a rotary changeover switch or the like, to a condenser which is for this purpose charged at a predetermined potential. In the succeeding cycle of the machine, the charge voltage of the said condenser is applied to a relay through switching means. The said relay may consist, for example, of an electromagnetic relay alone, or of an electromagnetic relay actuated through an electronic relay, a thyratron or the like, depending upon circumstances. The actuation of the said relay partially discharges the condenser and controls the transmission of a synchronised pulse produced by the pulse generator. The pulse thus transmitted is in phase, in the cycle in which it is transmitted, with the pulse which has been stored in the preceding cycle and it is sufficiently strong to be able, on the one hand, to actuate directly electromagnetic devices (relays, electromagnets, or the like), and on the other hand, through switching members, to charge if necessary another storage condenser, the partial discharge of which will control the transmission of a corresponding synchronised pulse in the succeeding cycle.

After the actuation of a relay, each condenser of the storage device is automatically brought, by switching means, to a fixed potential such that the said condenser cannot again trigger a relay unless it has meanwhile been recharged.

In a preferred embodiment of the invention, the condensers of the storage device are charged and discharged through inductive circuits which are so designed as to reduce the strength of the current in the circuits at the instant when the current is established or interrupted in the said circuits, and through switching means. Means are provided to maintain the contact of an electromagnetic relay closed throughout the duration of the transmission of a synchronised pulse transmitted from the generator to the utilisation circuits through the said contact. Means are also provided to reduce or interrupt the discharge current of a condenser in the winding of the electromagnetic relay before the discharge circuit of the said condenser is broken by the switching means.

Figure 2:
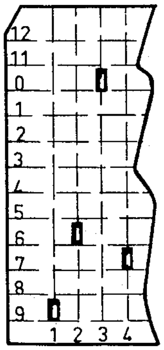
Figure 3:
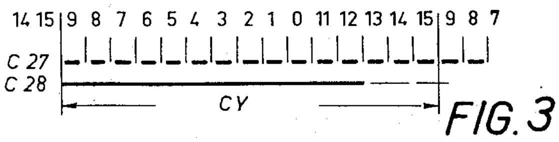
Figure 4:
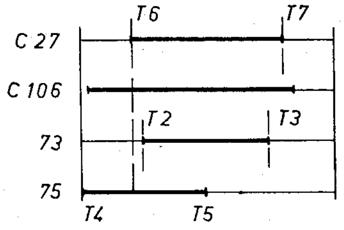
Figure 5:
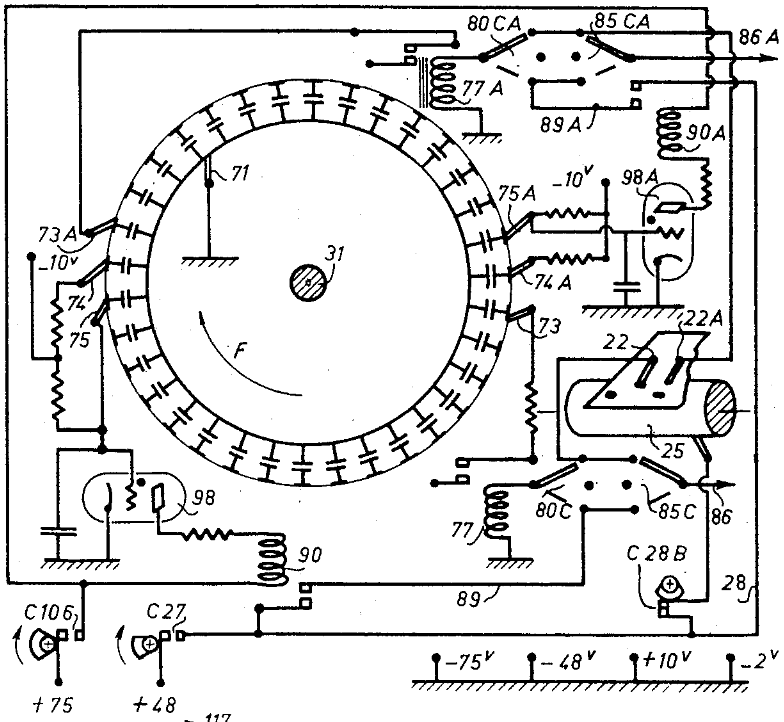
Figure 6:
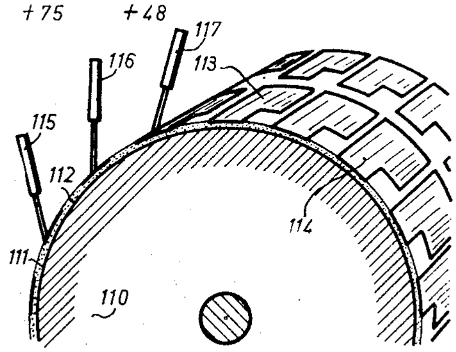
Figure 7:
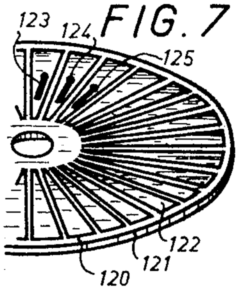
Figure 8:
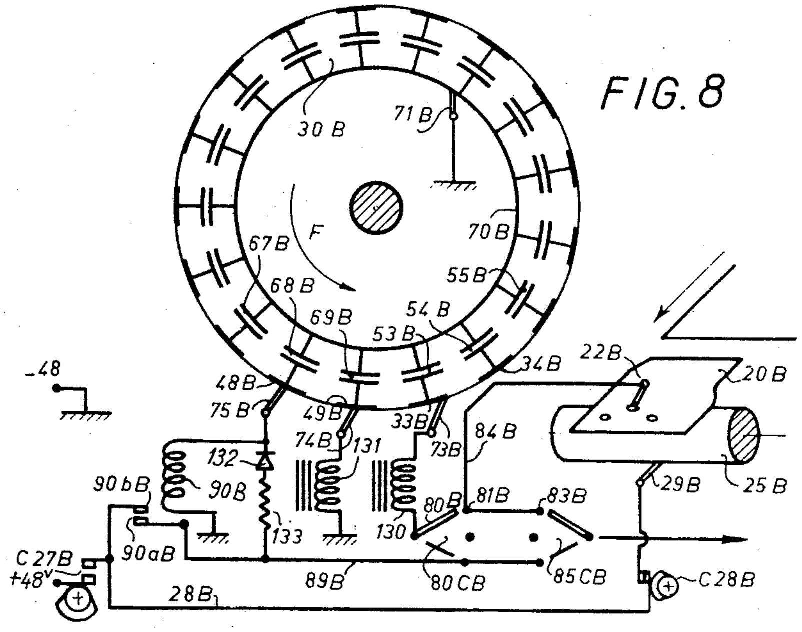
Figure 11:
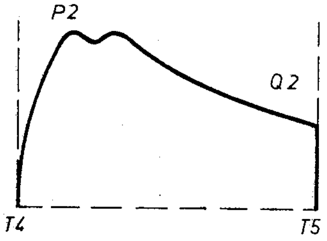
Figure 12:
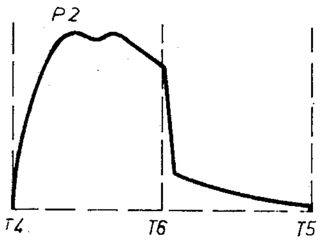
Figure 14:
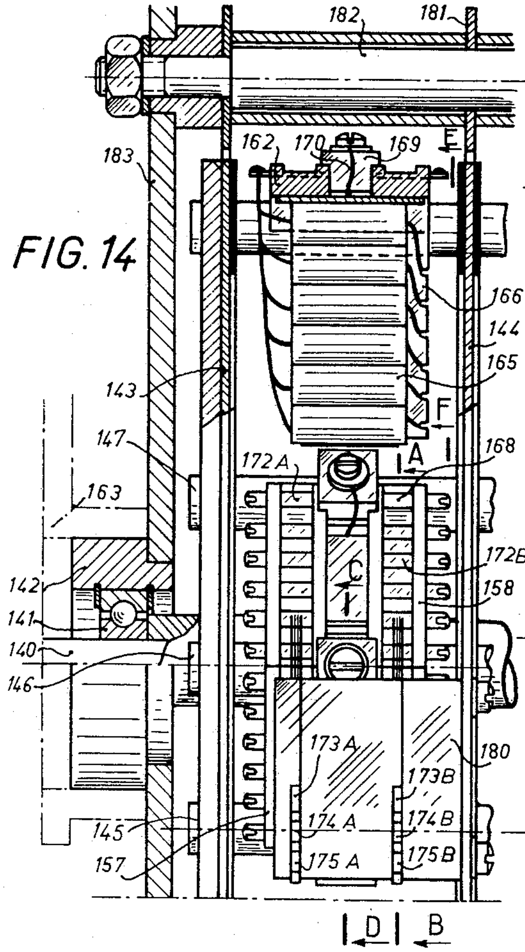
Figure 9:
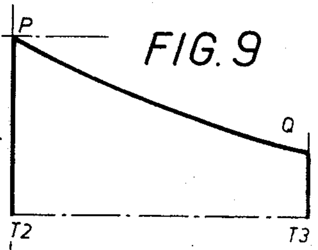
Figure 10:
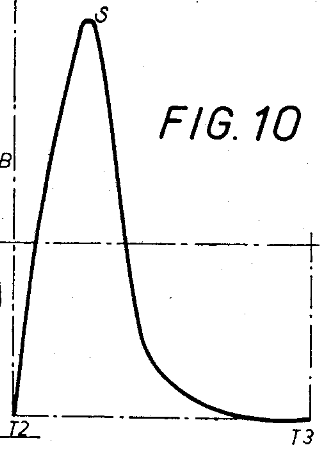
Figure 13:
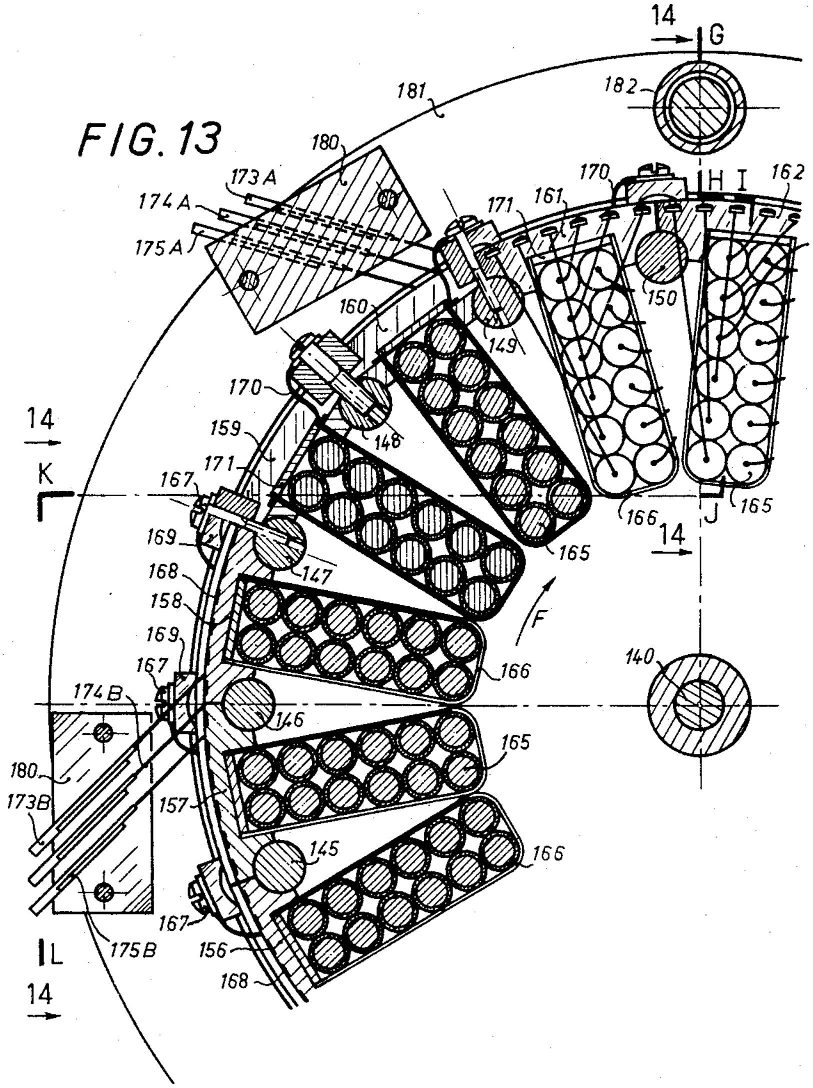

Further advantages and features of the invention will become more readily apparent from the following description, with reference to the accompanying drawings, in which:

FIGURE 1 is a simplified diagram of a storage device comprising condensers with a relay consisting of an electronic triggering tube controlling an electromagnetic relay, FIGURE 2 illustrates a fragment of a record card bearing particulars recorded by punching, FIGURE 3 is a diagram indicating the instants when the various recording locations in a recording card column can be analysed in the course of a machine cycle, FIGURE 4 is a diagram of the relative duration of the closing of certain contacts in a cycle point, FIGURE 5 is a diagram of a double storage device comprising relays having a triggering tube and electromagnetic relays, FIGURE 6 illustrates a construction comprising condensers and switching contact studs disposed in the form of a drum in a storage device, FIGURE 7 illustrates a construction comprising condensers and switching contact studs disposed in the form of a disc in a storage device, FIGURE 8 is a diagram of a storage device in which an electromagnetic relay can be actuated directly by the current supplied by a storage condenser, FIGURES 9 to 12 are diagrams indicating the various of the electric current in various circuits, FIGURE 13 is a fragmentary view along various sectional planes of the condenser supports and switching means in a section of a storage device, and FIGURE 14 is a fragmentary sectional view along G, H, I, J, K and L of FIGURE 13, showing constructional details.

The storage device diagrammatically illustrated in FIGURE 1 is designed to write and to read in the course of one or more successive cycles, information transmitted in the form of electric pulses and emanating from an analysing device in a registering punched-card machine. A machine may comprise as many like storage devices as there are record columns analysed in a record card or more in order to be able to store also information emanating from computing, integrating or other devices. In the record card fragment illustrated in FIGURE 2, numerical data are shown recorded in the form of perforations punched in columns and along horizontal lines denoted by numbers. The numbers disposed in the vertical column indicate, in principle, the value of the numbers represented by perforations punched along the corresponding horizontal line. The perforations punched in the vertical columns 1, 2, 3 and 4 of the card represent the digits 9, 6, 0 and 7 respectively. Numerical values may also be represented in a record card by combinations of perforations punched along a common horizontal line in a number of contiguous columns in the binary code or the like.

Alphabetical data, signs or control indications may also be represented by perforations punched along the lines 0, 11 or 12 or by combinations of a number of perforations punched in a common column in accordance with a code. In the diagram of FIGURE 1, an analysing device, illustrated very diagrammatically, comprises known means for advancing record cards 20 and 21 under an analysing brush system with a continuous movement. The analysing brush system comprises brushes 22, 23, 24 . . . disposed in a row and at least equal in number to the number of columns simultaneously analysed. During the advance of the cards, the brushes can make contact, through the perforations, with a contact roller 25 which receives synchronised pulses emanating from a generator consisting of a 48-volt current source, of which the positive terminal is connected to a cam contact C27, and the negative terminal to earth. The said contact is actuated by a cam driven by a shaft (not shown), which rotates synchronously with the advance of the punched positions on the cards under the analysing brushes. The pulses thus produced are transmitted to the contact roller 25 through a line 28 of a cam contact C28 and a contact brush 29 sliding on the said roller.

Synchronised pulses are transmitted to the contact roller only at the instants when, in a machine cycle, perforations are able to be analysed in a card. The diagram of FIGURE 3 indicates in a cycle CY the points, numbered 9 to 12, during which a perforation can be analysed in a card column by a synchronised pulse emanating from the generator. The points 13, 14 and 15 correspond in the cycle to the time taken to pass from one card to the next under the analysing brush system. During this time, the contact cam C28 is open and does not allow the passage of the pulses 13, 14 and 15 emanating from the generator. The diagram of FIGURE 4 indicates the time during which each of the points 9 to 15 of the cycle, the contact C27 of the pulse transmitter and a contact C106 are closed.

The storage device proper comprises a drum 30 which, during the operation of the machine, rotates in the direction of the arrow F with a continuous rotational movement on a shaft 31 in synchronism with the advance of the cards under the analysing brushes. A number of like elements, or storage sections, may be mounted side-by-side on a common shaft. For a machine in which a machine cycle is divided into 15 points, each storage section is provided with 17 switching contact studs 33, 34 . . . 48 and 49. Each switching stud is connected to an electrode of a condenser 53, 54 . . . 68 or 69, having a capacity of 10,000 micro-microfarads, the other electrode of which is connected to a contact ring 70, on which there slides a contact brush 71 connected to earth. Three brushes 73, 74 and 75 are arranged to make contact with each of the switching contact studs successively at predetermined instants in each cycle point. The brush 73 is in contact with a switching stud at each cycle point during the time indicated at 73 on the diagram of FIGURE 4. This brush, called the charging brush, is connected through a resistance 76 (of 10,000 ohms) to the normally open contact stud 77_a_ of an electro-magnetic relay 77. The other contact stud 77_b_ of the said relay is connected to a current source of +2 volts, the negative terminal of which is connected to earth. The speed of rotation of the drum 30 is such that when the stud 33 of the condenser 53, for example, is in contact with the brush 73 at the point 1 of a cycle, the said stud is brought into contact with the brush 75 at the point 1 of the succeeding cycle. Since a cycle is divided into 15 points, and the interval between the brush 75 and the brush 73 is, by construction, two cycle points, each storage section comprises 17 studs, as has already been stated. Under these conditions, in a machine operating at a rate of 300 cycles per minute, the shaft 31 drives the drum 30 at a speed of $$300\times\frac{15}{17}=\text{approximately } 264.71 \text{ revolutions per minute.}$$

The winding of the electromagnetic relay 77 is connected on the one hand to earth and on the other hand to the distributor 80 of a three-way switch 80C, of which the contact stud 81, called the reading stud, is connected on the one hand through the line 84 to the analysing brush 22, and on the other hand through a line 82 to the contact stud 83 of a three-way switch 85C. The distributor 85 of the switch 85C is connected to a line 86 which is connected, in the machine, to utilisation circuits. A contact stud 87 of the switch 80C, which is not connected to anything, corresponds to a position called the erasing position. The stud 88 of the said switch is connected on the one hand by a line 89 to the contact stud 90_a_ of a relay 90, and on the other hand through a line 91 to a contact stud 92 of the switch 85C. A contact stud 90_b_ off the relay 90 is connected to the cam contact C27 of the pulse transmitter. In the course of each cycle point, the brush 75 is brought into contact with a switch stud, as indicated at 75 in FIGURE 4, in advance of the time of contact of the brush 73 with one of the said studs. The brush 75 is connected via a line 96 on the one hand to the control grid 97 of a triggering gas discharge tube 98, generally known as a thyratron, and on the other hand to a condenser 99 (of 500 micro-microfarads) and to a resistance 101 (of 1 megohm) which is connected to a current source at a fixed potential of −10 volts. The positive terminal of the said current source is connected to earth. The line 96 is provided with a shielding which is connected to earth by a link 102. The cathode 103 of the tube 98 is directly connected to earth and the anode 104 of the said tube is connected to a current source at fixed potential (+75 volts) through a resistance 105 (of 2,000 ohms) of the winding of the relay 90, and through a cam contact C106, the closing time of which in each cycle point is indicated at C106 in the diagram of FIGURE 4.

The brush 74, which is disposed between the brushes 73 and 75, is connected to −10 volts through a resistance 107 (of 10,000 ohms). The position of this brush, between the brushes 73 and 75, is immaterial. It is sufficient for the said brush to be unable to come into contact with any one stud at the same time as one or other of the brushes 73 or 75.

The operation of the device is as follows:

For the utilization and simultaneous storage of analysed data, the distributor 80 of the switch 80C is positioned, from the commencement of a cycle, on the contact stud 81 and the distributor 85 of the switch 85C is positioned on the contact stud 83, as indicated in FIGURE 1. These switches may consist of relay contacts, the movements of which are controlled in each cycle in accordance with a known technique employed in machines operating with record cards or tapes.

As a record card is advanced under the analysing brush system, a perforation 6, for example, is analysed in the card at the point 6 of the cycle. The closing of the contact C27 at this point of the cycle sends a synchronised pulse through the following circuit: +48 volts, contact C27, line 28, cam contact C28, brush 29, roller contact 25, perforation 6 in the card, brush 22, line 84, stud 81, distributer 80, winding of the relay 77 and return of the current to the −48-volt source through earth. The energisation of the relay 77 closes the contact 77$a$, 77$b$. A circuit is established so as to transmit a pulse 6, which is stored by the charging of a condenser, through the following circuit: +2 volts, contact 77$a$, 77$b$ (closed), resistance 76, brush 73, stud 33, condenser 53, contact ring 70, brush 71 and return to the −2-volt source through earth. If other perforations are analysed in the same card column, other condensers will be charged in the same manner during the rotation of the drum 30. At the end of the cycle, that is to say during the points 13, 14 and 15 of the cycle, the switches 80C and 85C are actuated and brought on to the studs 88 and 92 respectively by the reading, in the succeeding cycle, of the stored data. Fifteen cycle points after the passage of the stud 33 under the brush 73, that is to say, at the point 6 of the succeeding cycle, the said stud passes under the brush 75 and the charged potential (+2 volts) of the condenser 53 is applied to the control grid of the gas discharge tube 98 during the time T4—T5, as indicated in FIGURE 4. When the contact C106 is closed, shortly after the time T4, a voltage of +75 volts is applied through the winding of the relay 90 and the resistance 105 to the anode 104 of the tube 98, which is thus triggered. An electric current is then set up in the winding of the relay 90, which is thus energised and the contact 90$a$, 90$b$ is closed. When the contact C27 is then closed at the time T6 (FIGURE 4,) a circuit is established through this contact as follows: +48 volts, contact C27 (closed), contact 90$a$, 90$b$ (closed), line 89, stud 88 and, on the one hand, distributor 80 of the switch 80C, winding of the relay 77, which is energised, and earth. A circuit is established on the other hand through the line 91, the stud 92, the distributor 85 of the switch 85C and the line 86 for the utilisation, if desired, of a pulse 6 in the circuits of the machine. The energisation of the relay 77 closes the contact 77$a$, 77$b$ and a pulse 6 is stored at this instant by the charging of the condenser 55. If the switches 80C and 85C are maintained in the same position for a number of cycles, a synchronised pulse will be supplied along the line 86 by the same process, at the point 6 of each of the said cycles. It will be noted that the pulse 6 which was originally stored in the condenser 53 is stored in the condenser 55 in the succeeding cycle. A similar shift occurs in each cycle. There is therefore no regeneration of the charge in a condenser, but a transfer of one charge into another condenser, whereby the utilisation of the condensers of a storage device is fairly uniformly distributed. In addition, it is thereby possible automatically to check the state of the condensers for the good operation of the device. For example, a checking pulse may be automatically written at one of the points 13, 14 and 15 of each cycle, provided that this cycle point is not being otherwise utilised, and it can then be checked whether this pulse is in fact re-transmitted at each cycle at the chosen cycle point. When the stud 33 leaves the brush 75 after having actuated the relay, the condenser 53 has not been entirely discharged, but the stud 33 of this condenser thereafter passes under the brush 74, at which it receives a charge of inverse polarity (−10 volts), which it retains during the succeeding cycles if it is not meanwhile positively charged by a pulse which is to be written and which is to be applied to the brush 73. By positioning the switches 80C and 85C respectively on the studs 81 and 92, it is possible in the course of one cycle to extract stored particulars and to introduce fresh (different) ones into the storage device.

The diagram of FIGURE 5 shows a storage section which comprises two devices similar to that just described and which are disposed on the periphery of a common drum section. One of the two storage devices is denoted in this figure by the same references as that illustrated in FIGURE 1, and the other device is denoted by the same references followed by the index "A." This arrangement is intended to show that, by virtue of the brushes 74 and 74A by which the condensers are systematically discharged after passing under the brushes 75 and 75A, each storage device forms in itself a completely independent looped circuit. This feature makes it possible to provide any number of independent storage devices on the periphery of one drum section.

It will hereinafter be shown that the provision of a number of storage devices on one drum section is particularly advantageous from the viewpoints of facility of production, reduction of over-all dimensions, facility of maintenance and operating reliability.

In the examples just described, the capacitances employed for the storage have relatively low values (several thousandths of a microfarad) and assemblies of capacitances and of switching devices for these storage devices may with advantage be constructed in different ways.

In the arrangement illustrated in FIG. 6, a conductive drum 110, or a drum coated with a conductive layer 111, connected to earth, constitutes a condenser electrode. Disposed on the said conductive layer 111 is a thin layer 112 of a dielectric having high specific inductive capacity which may have ferro-electric properties. There have been applied to the dielectric layer 112 by impression, cathode sputtering or any other appropriate method, conductive surfaces 113 each having a portion 114 shaped to form a contact stud. Brushes 115, 116 and 117 fast with a fixed support (not shown) are so arranged that, in passing, they apply electric voltages to the condensers thus formed, or collect such voltages therefrom. FIGURE 7 illustrates another constructional form of the condensers and switching means of a storage device in which a dielectric layer 120 is applied to the conductive disc 121. Conductive surfaces 122 are applied to the dielectric layer and brushes 123, 124 and 125 are arranged to apply electric voltages to the said condensers or to collect such voltages therefrom.

A disc may naturally be provided with similar means on each of its two faces.

By reason of the use of capacitances of low value, it is necessary to ensure absolutely satisfactory conditions of insulation and to employ electronic relays to actuate electromagnetic relays.

In a preferred form of application of the invention, it is considered particularly advantageous to employ condensers of sufficiently high capacitance to be able to store, in each of the said condensers, a sufficient quantity of energy to be able directly to actuate an electromagnetic relay and to avoid the use of fragile and costly electronic relays. Recent progress made in the manufacture of (chemical) condensers makes it possible to provide considerable capacitances in small spaces. Thus, for example, 5-microfarad condensers (−20%+50%) designed for direct-current service voltage of 70 volts have dimensions of 6 millimetres in daimeter and 22 millimetres in length, i.e. a volume of 0.621 cubic centimetre. As will hereinafter be shown, it is possible with such condensers to provide particularly economic constructional forms of very small overall dimensions. However, the use of high capacitances and relatively high charging voltages generally causes sparking at the making and breaking of the circuits, which results in rapid deterioration of the contact elements of the switching means. In order to obviate these disadvantages and to ensure a long useful life of the switching means, there are provided particular means which substantially obviate sparking at the instant of the closing and opening of the circuits for charging and discharging the condensers. These arrangements also afford particular conditions for the charging and discharging of the condensers, which permit high speeds of operation of the devices.

Since the energy stored in the condensers is necessarily limited, it is particularly advantageous to employ quick-acting relays having high electromagnetic output, for example of the type described in United States patent application Serial No. 796,693, filed 2nd March 1959, by Compagnie des Machines Bull for "Improvements in Relays." These relays permit reliable high-speed operation of condensers of relatively low capacitance.

In the diagram of FIGURE 8, elements analogous to those illustrated in the diagram of FIGURE 1 bear the same references followed by the index "B." A drum 30B supports condensers 53B, 54B, 55B . . . 67B, 68B and 69B. These condensers are connected, on the one hand, to studs 33B, 34B . . . 48B and 49B and to a contact ring 70B connected to earth by a brush 71B. The brushes 73B, 74B and 75B are arranged in the same manner as the brushes 73, 74 and 75 of FIGURE 1. The brush 74B is connected to the distributor 80B of the switch 80CB through a self-inductance 130. The brush 74B is connected to earth through a self-inductance 131. The brush 75B is connected, on the one hand, to earth through the winding of the relay 90B and on the other hand to the line 89B through a rectifier element or diode 132 and a resistance 133. The distributors of the switches 80CB and 85CB being connected to the studs 81B and 83B respectively, the operation of the device is as follows: a record card 20B being advanced under the analysing brush system, a perforation is analysed, for example at the point 6 of the cycle, in the card column explored by the brush 22B. A circuit is established as follows: +48 volts, contact C27B (closed; line 28B, contact C28B, contact brush 29B, contact roller 25B, perforation 6, brush 22B, line 84B, stud 81B of the switch 80CB, distributor 80B, self-inductance 130, brush 73B, stud 33B, condenser 53B, contact ring 70B, brush 71B and earth. If, instead of the self-inductance 130, there was only an ohmic resistance in the circuit, then at the instant T2 (FIGURE 4) when the brush 73B comes into contact with the stud 33B, the condenser 53B would be charged under the conditions indicated by the diagram of FIGURE 9, that is to say, at the instant T2, the charging current would immediately reach a value P determined by the voltage +48 volts and by the total ohmic resistance of the circuit. As a result of the charging of the condenser, the strength of the current would decrease to a value Q at the instant T3 when the brush 73B leaves the stud 33B. Under these conditions, the brush and the switching stud would establish a circuit at a current P and would thereafter break this circuit at a current Q, which would involve the danger of damage to the contact elements. For storage devices utilising capacitances of from 5 to 7 microfarads, self-inductances 130 and 131 of from 22 to 23 millihenrys are provided with an ohmic resistance of about 90 ohms. Under these conditions, the charging rate of a condenser is that shown in the diagram of FIGURE 10. At the instant T2, the self-inductance retards the setting-up of the current, but the latter thereafter reaches, by virtue of the self-inductance, a value S, which then rapidly decreases. At the instant T3, the storage condenser is completely charged and the current which is interrupted by the switching brush is substantially zero. Fifteen cycle points later, that is to say, at the succeeding cycle, the stud 33B is brought under the brush 75B. If the relay 90B were only connected to the said brush 75B, that is to say, without the circuit of the diode 132, the rate at which the condenser discharges into the winding of the said relay would be that illustrated in the diagram of FIGURE 11. At the time T4, when the brush 75B comes into contact with the stud 33B, the current would be set up with some delay, by reason of the inductance of the winding of the relay, and would then reach the value P2. There would be observed at this instant a slight fluctuation of the strength of the current in the winding of the relay at the instant of the lowering of the movable blade closing the contact of the said relay, owing to a variation of the reluctance of the magnetic circuit. The current strength would thereafter decrease to a value Q2 at the instant T5 when the current was interrupted at this strength by the stud 33B leaving the brush 75B. In fact, since the diode 132 is connected to the brush 75B, the discharge current of the condenser varies in accordance with the diagram of FIGURE 12. At the instant T4 (see also FIGURE 4) the stud 33B of the condenser 53B (charged) is brought into contact with the brush 75B and a discharge current is set up in the winding of the relay with some time lag caused by the self-inductance of the said winding, and then reaches the value P2 at the instant when the blade of the relay closes the contact **90*a*B, 90*b*B. The diode 132 prevents the condenser 53B from discharging through the line 89B into the utilisation circuits. At the instant T6 of the point of the cycle (FIGURE 4), the contact C27B is closed and a voltage of 48 volts is applied to the line 89B through the contact 90*a*B, 90*b*B, which is enclosed. The contact brush 75B is then subjected to a voltage in the neighbourhood of 24 volts, which results from the distribution of the voltage of 48 volts between the winding of the relay 90B, the diode 132 and the resistance 133, which are in series. The discharge of the condenser is stopped at this instant by the voltage set up at the brush, and maintains the relay 90B energised through the following circuit: +48 volts, contact C27B (closed), contact 90*a*B, 90*b*B (closed), resistance 133, diode 132, winding 90B and return to −48 volts through earth. When the stud 33B leaves the brush 75B at the time T5 (FIGURES 4 and 12), the current interrupted by the switching device is several milliamperes or zero, and the relay 90B is maintained energised until the instant T7 (FIGURE 4) when the cam contact C27B is opened. It is to be noted that the contact 90*a*B, 90*b*B** of the relay has not had to establish or interrupt a current, so that sparking is avoided and a very long useful life of the contact surfaces is ensured.

In the example described, the relay 90B is an electromagnetic relay for a voltage of 24 volts, which is actuated by the discharge of a condenser charged at 48 volts. This ensures a speed of response of the order of 1.5 milliseconds and high operating reliability of the said relay. The latter is thereafter maintained energised at a normal holding voltage through the resistance 133 and the diode 132.

The above-described storage device can operate with condensers of only 2 microfarads. However, 5–7-microfarad condensers have been chosen to ensure absolute operating reliability of the device.

FIGURES 13 and 14 partially illustrate the arrangement of the condensers and of the switching means (brushes and studs) in a constructional form of a storage device having high storage capacity, each storage unit of which operates in accordance with the principle illustrated by the diagram of FIGURE 8. A storage group of this type comprises, in principle, five double sections, of which only one is partly shown. A machine may comprise as many storage groups as are necessary for the operations for which this machine is designed. The sections of a storage group are shown side-by-side on a rotating shaft 140, which is supported by ball bearings 141, only one of which can be seen in FIGURE 14. The bearings are maintained in beds 142 fast with the frame 163 of the machine. Mounted on the shaft 140 are plates 143, 144 (6 plates to 5 sections) connected together by bars disposed in squirrel-cage form, the bars 145, 146, 147, 148, 149 and 150 only being shown in FIGURE 13. Mounted on the bars are insulating blocks 156, 157, 158, 159, 160, 161 and 162, which support condensers 165 and are secured to the bars by screws 167 and shims 169. A section comprises 17 blocks. Each block is provided with a metal support 166 which supports 12 condensers. Conductive strips or studs 168 are enclosed by moulding in the insulating blocks. One electrode of each condenser is connected, in each block, to a stud and the other electrode is connected to the metal support 166. Each support is electrically connected to earth through a link 170 clamped under a securing screw 167. Plates 171 maintain the condensers securely in each support.

In FIGURE 13, the condenser-supporting blocks 156, 157 and 158 are illustrated in section along the line A—B of FIGURE 14. The blocks 159 and 160 are illustrated in section along the line C—D, and the blocks 161 and 162 are illustrated in section along the line E—F of FIGURE 14. In FIGURE 14, the block 162 is illustrated in section along the line I—J of FIGURE 13, and the blocks 157 and 159 are illustrated in position with a brush holder in section along the line K—L of FIGURE 13, as seen in the direction of the arrows 14—14.

The studs of the various blocks of one section are arranged (FIGURE 14) to form two continuous tracks 172A and 172B on which slide the brushes 173A, 174A and 175A in the case of the track 172A, and the brushes 173B, 174B and 175B in the case of the track 172B. The brushes are fixed in groups of six in insulating supports 180 which are disposed at 60° in relation to one another around the axis of each section. Each track therefore comprises six storage units, each comprising the elements of the diagram of FIGURE 8, and the two tracks of one section form twelve storage units per section. Under these conditions, for a machine whose cycles are divided into fifteen points, each storage unit comprising in principle seventeen switching studs and the machine operating at a rate of 300 cycles per minute, the shaft 140 of the device illustrated in FIGURE 14 rotates at a rate of $$\frac{15}{17}\times\frac{300}{6}=\text{about 44.11 revolutions per minute}$$

The brush holders 180 are fixed to a supporting ring 181 in the case of the two tracks of each section. These rings are supported in each group by bars 182, which are secured at 120° in relation to one another on supporting cheeks 183 fast with the frame of the machine. Each condenser-supporting block is constructed with only six studs to each track of a section and the reduced dimension of these blocks makes it possible, if necessary, to remove them and to re-fit them one at a time for the purpose of replacement or checking without removing (or upsetting the adjustment of) the brush holders.

It will be obvious that the examples described to illustrate some forms of application of the invention have no limiting character and that the arrangements according to the invention may be adapted and employed alone or in combination, in accordance with the conditions and applications without departing from the scope of the invention.

I claim:

1. A device for the cyclic repetition of electric pulses comprising condensers each having a first electrode connected to a contact stud of a rotary switch, the second electrodes of the said condensers being brought to a fixed potential, at least two brushes for sliding on the said contact studs, the first brush being connected to a charging circuit controlled by the pulse to be repeated, the second brush being connected to a discharge circuit for simulanteously controlling a utilisation circuit and the said charging circuit, so that a condenser having an electrode connected to the first brush is charged by the control pulse and is discharged one cycle later, when the said electrode is connected to the second brush, the said discharge controlling the charging of another condenser whose first electrode is connected to the first brush.

2. A device according to claim 1, wherein the circuits for charging and discharging the storage condensers are inductive circuits.

3. A device according to claim 1, wherein a number of devices independent of one another are disposed on the periphery of one contact-stud switch, and the condensers connected to the contact studs of the said switch can, in the course of one complete rotation of the said switch, be successively utilised in various devices in the course of successive cycles.

4. A device according to claim 3, wherein the circuits for charging and discharging the storage condensers are inductive circuits.

5. A device according to claim 1, wherein a third brush is so arranged that, after having passed under the second brush, each switch stud is brought into contact with the said third brush, through which the corresponding electrode of each condenser is brought to a potential which cannot act on the utilisation circuits.

6. A device according to claim 5, wherein a number of devices independent of one another are disposed on the periphery of one contact-stud switch, and the condensers connected to the studs of the said switch can, in the course of one complete rotation of the said switch, be successively utilised in various devices in the course of successive cycles.

7. A device according to claim 5, wherein the circuits for charging and discharging the storage condensers are inductive circuits.

8. A device according to claim 6, wherein the circuits for charging and discharging the storage condensers are inductive circuits.

9. A device for retarding by one cycle a pulse for reading a punched-card column comprising a punched-card analysing device, a series of condensers each having a first electrode connected to a contact stud of a rotary switch, the second electrodes of the said condensers being brought to a fixed potential, a card column reading circuit brought to a direct voltage and connected to a utilisation circuit, as also to a first brush adapted to slide on the contact studs of the switch so as to charge the condenser connected to the said brush, a discharge circuit connected to a second brush sliding on the contact-stud switch controlling the utilisation circuit, in such manner that the charged condenser is discharged one cycle later, the said discharge generating a pulse in the utilisation circuit.

10. A device according to claim 9, wherein the circuits for charging and discharging the storage condensers are inductive circuits.

11. A device according to claim 9, wherein a number of devices independent of one another are disposed on the periphery of one contact-stud switch and the condensers connected to the contact studs of the said switch can, in the course of one complete rotation of the said switch, be successively utilised in various devices in the course of successive cycles.

12. A device according to claim 11, wherein the circuits for charging and discharging the storage condensers are inductive circuits.

13. A device according to claim 9, wherein a third brush is so arranged that, after having passed under the second brush, each contact stud of the switch is placed in contact with the said third brush, through which the corresponding electrode of each condenser is brought to a potential which cannot act on the utilisation circuits.

14. A device according to claim 13, wherein a number of devices independent of one another are disposed on the periphery of one contact-stud switch, and the condensers connected to the contact studs of the said switch can, in the course of one complete rotation of the said switch, be successively utilised in various devices in the course of successive cycles.

15. A device according to claim 13, wherein the circuits for charging and discharging the storage condensers are inductive circuits.

16. A device according to claim 14, wherein the circuits for charging and discharging the storage condensers are inductive circuits.

No references cited.